(12) United States Patent
Spiegelberg et al.

(10) Patent No.: US 8,033,153 B1
(45) Date of Patent: Oct. 11, 2011

(54) METHOD AND APPARATUS FOR MANUFACTURING A BATTERY TERMINAL WITH UNDERCUT RINGS

(75) Inventors: Bernard N. Spiegelberg, Germantown, WI (US); Terry J. Evraets, West Bend, WI (US)

(73) Assignee: Tulip Corporation, Milwaukee, WI (US)

( * ) Notice: Subject to any disclaimer, the term of this patent is extended or adjusted under 35 U.S.C. 154(b) by 0 days.

(21) Appl. No.: 12/611,000

(22) Filed: Nov. 2, 2009

Related U.S. Application Data

(60) Division of application No. 11/388,708, filed on Mar. 24, 2006, now Pat. No. 7,628,049, which is a continuation-in-part of application No. 10/615,073, filed on Jul. 8, 2003, now Pat. No. 7,021,101, which is a continuation of application No. 09/881,261, filed on Jun. 14, 2001, now Pat. No. 6,644,084.

(51) Int. Cl.
*B21D 15/00* (2006.01)
(52) U.S. Cl. .................... 72/107; 72/88; 72/91; 72/110
(58) Field of Classification Search ............. 72/76, 102, 72/107, 110, 118, 120, 121, 88, 91
See application file for complete search history.

(56) References Cited

U.S. PATENT DOCUMENTS

| | | | | |
|---|---|---|---|---|
| 827,290 | A * | 7/1906 | Boylan et al. | 72/121 |
| 1,493,836 | A * | 5/1924 | Wurster | 72/107 |
| 2,983,168 | A * | 5/1961 | Laban | 72/107 |
| 3,712,099 | A * | 1/1973 | Elsbett et al. | 72/107 |
| 4,168,618 | A | 9/1979 | Saieretai | |
| 4,173,877 | A * | 11/1979 | Kreiskorte | 72/105 |

(Continued)

FOREIGN PATENT DOCUMENTS

DE 42 41 393 C1 7/1994

(Continued)

OTHER PUBLICATIONS

Advertisement from Dionys Hofmann GmbH, "Battery Terminals—The Source of Power", undated (1 pg.) (undated).

(Continued)

*Primary Examiner* — Edward Tolan
(74) *Attorney, Agent, or Firm* — Rathe Lindenbaum LLP

(57) ABSTRACT

A method and apparatus to cold form rings or a lead battery terminal with undercuts or overhangs to improve the sealing properties of the rings. The apparatus can be one of a segmented die device and a die device wherein one die member moves relative to the other die member. In either apparatus at least one ring on the battery terminal is transferred from having a first shape into a second different shape with an overhang.

20 Claims, 12 Drawing Sheets

U.S. PATENT DOCUMENTS

| | | | |
|---|---|---|---|
| 4,426,870 A | | 1/1984 | Toropov et al. |
| 4,491,002 A | | 1/1985 | Toropov et al. |
| 4,942,752 A | | 7/1990 | Helfman |
| 5,364,714 A | | 11/1994 | Gurtler |
| 5,373,720 A | | 12/1994 | Ratte et al. |
| 5,440,796 A | * | 8/1995 | Deggau et al. ............ 29/412 |
| 5,606,887 A | | 3/1997 | Spiegelberg et al. |
| 5,632,173 A | | 5/1997 | Spiegelberg et al. |
| 5,655,400 A | | 8/1997 | Spiegelberg et al. |
| 5,791,183 A | | 8/1998 | Spiegelberg et al. |
| 6,161,409 A | * | 12/2000 | Friese ...................... 72/110 |
| 6,195,860 B1 | | 3/2001 | Di Rosa et al. |
| 6,216,510 B1 | | 4/2001 | Hashimoto |
| 6,223,576 B1 | | 5/2001 | Mashita |
| 6,298,703 B1 | | 10/2001 | Focken et al. |
| 6,470,724 B1 | * | 10/2002 | Friese ...................... 72/84 |
| 6,644,084 B1 | | 11/2003 | Spiegelberg |
| 7,021,101 B2 | | 4/2006 | Spiegelberg |
| 7,338,539 B2 | | 3/2008 | Ratte et al. |

FOREIGN PATENT DOCUMENTS

EP     0 601 268 B1     6/1994

OTHER PUBLICATIONS

Advertisement from Dionys Hofmann GmbH, "High Quality Battery Terminals", undated (1 pg.).

Fette Tool Systems, Inc., "Thread Rolling Systems", promotional materials printed in Germany, undated (10 pgs.).

\* cited by examiner

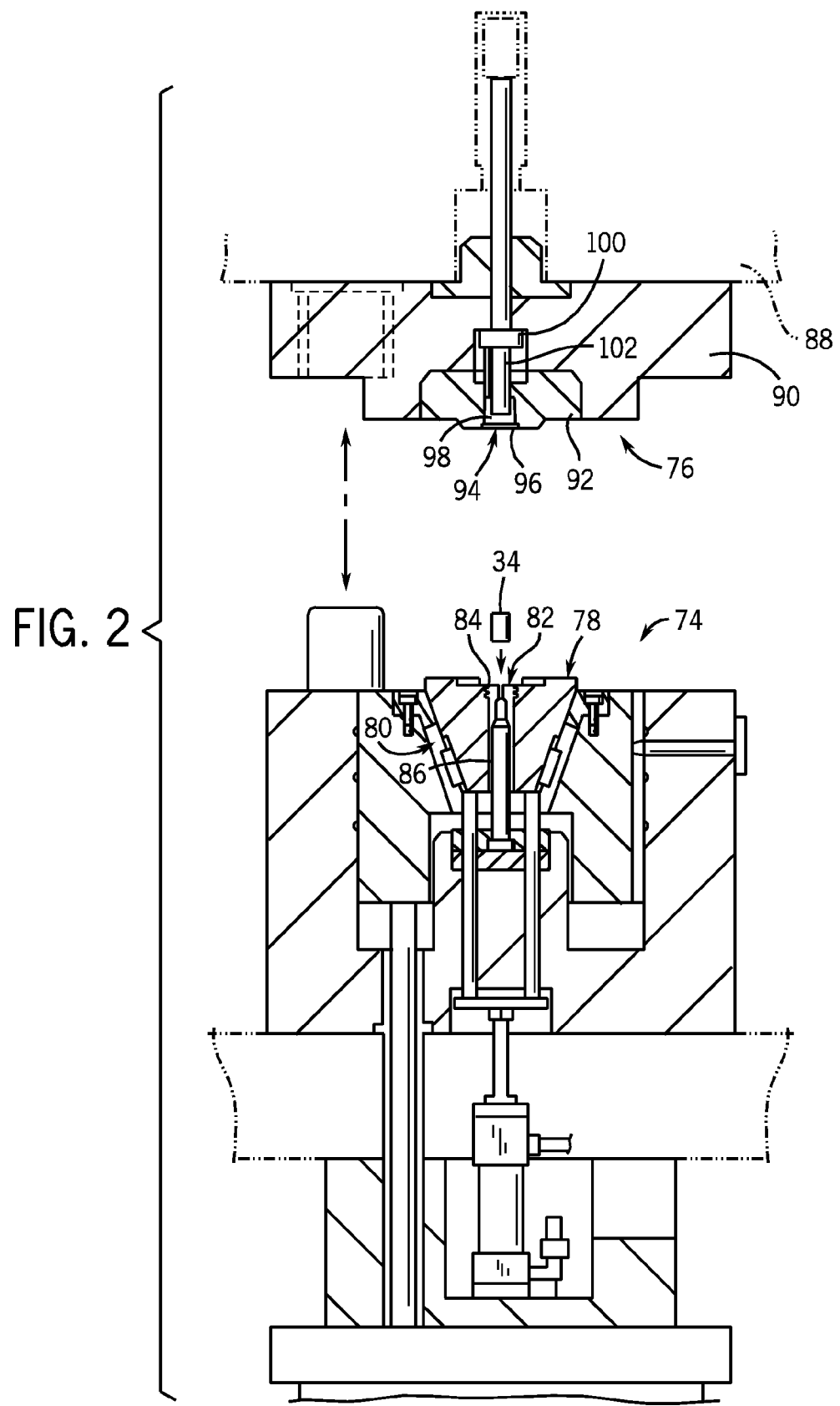

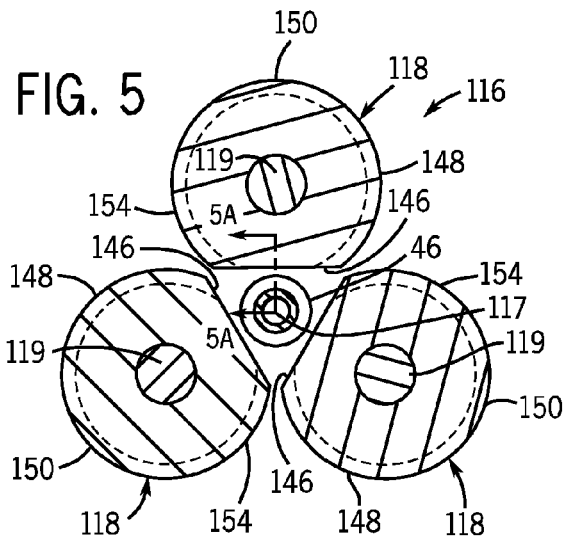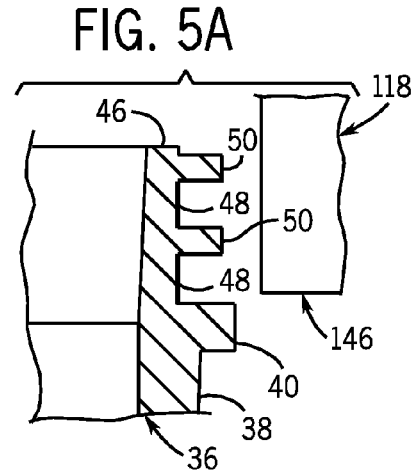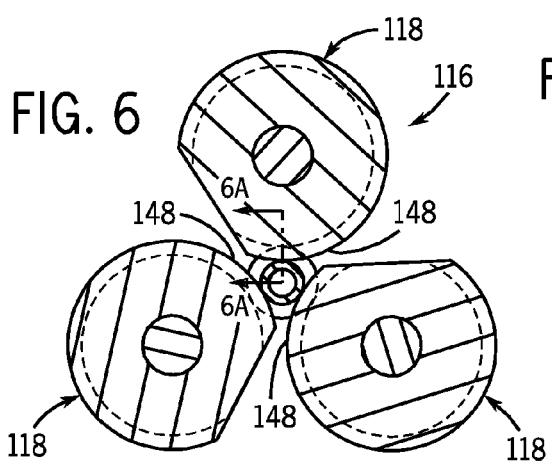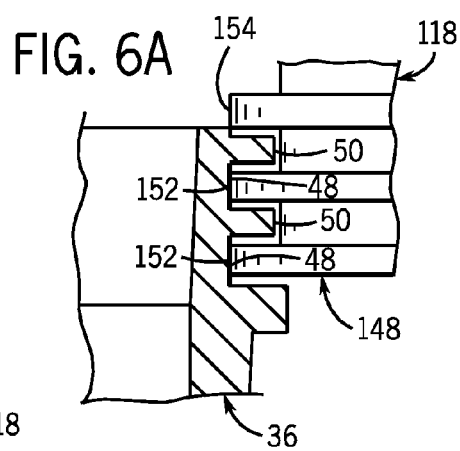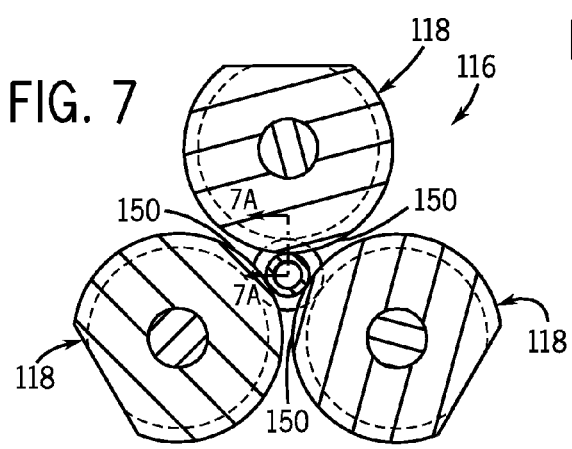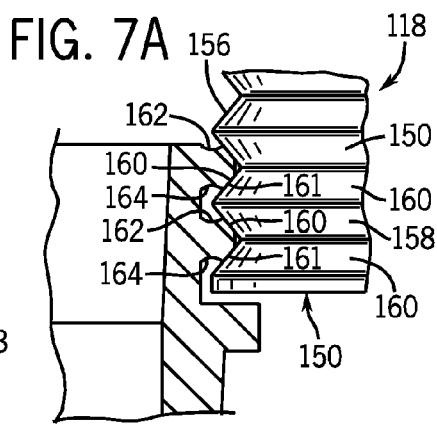

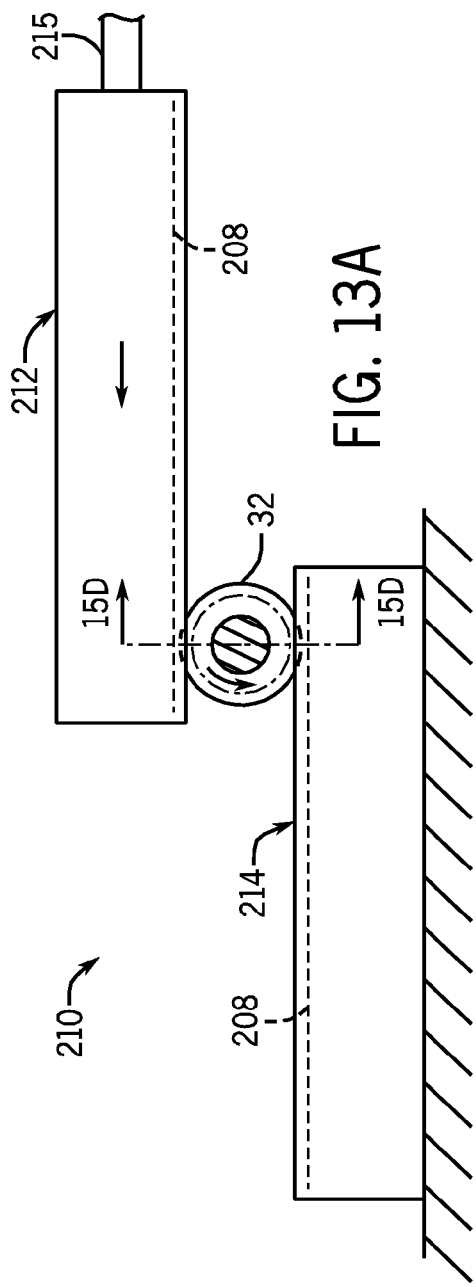
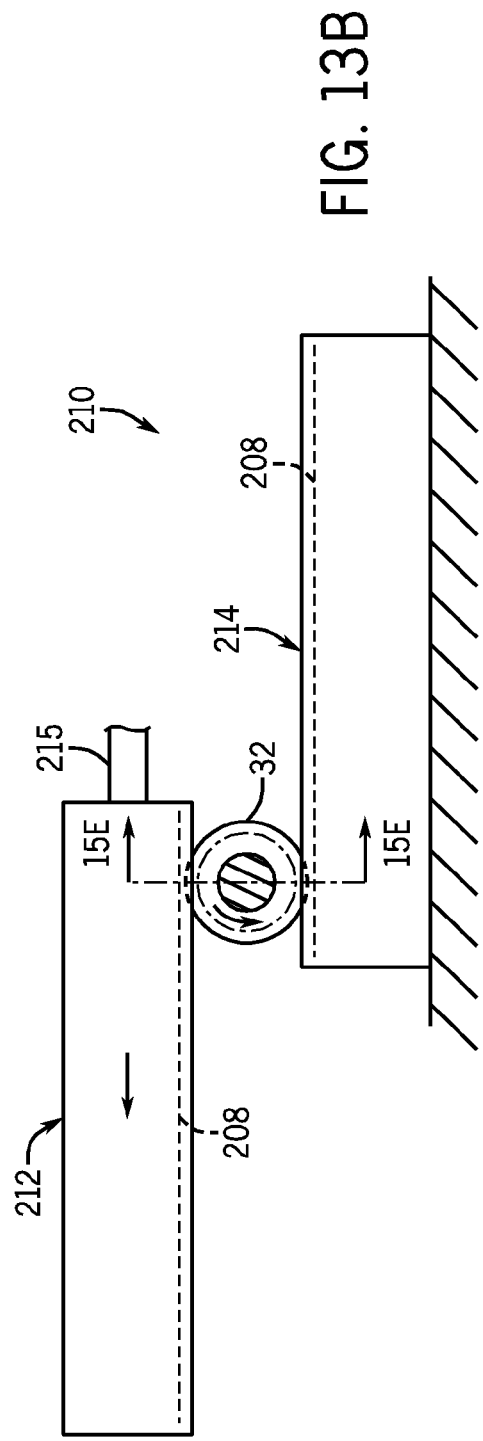

METHOD AND APPARATUS FOR MANUFACTURING A BATTERY TERMINAL WITH UNDERCUT RINGS

CROSS-REFERENCE TO RELATED APPLICATIONS

This application is divisional of U.S. patent application Ser. No. 11/388,708, filed, Mar. 24, 2006, which is a Continuation-In-Part of U.S. patent application Ser. No. 10/615,073, filed Jul. 8, 2003, now U.S. Pat. No. 7,021,101, which is a continuation of U.S. patent application Ser. No. 09/881,261, filed Jun. 14, 2001, now U.S. Pat. No. 6,644,084, titled "Method and Apparatus for Manufacturing a Battery Terminal with Undercut Rings" all of which are incorporated herein by their reference.

FIELD OF THE INVENTION

The present invention relates generally to an apparatus and method for cold forming of a ring on a lead battery terminal. More specifically, the invention relates to an apparatus and method for rolling or die punching undercut rings on a lead battery terminal.

BACKGROUND OF THE INVENTION

In general, battery terminals are utilized as an interface between a sealed battery container and an external device seeking electrical power. In sealed batteries containing liquid electrolyte, the battery terminal must be configured to prevent leakage of electrolyte to ensure the battery will not fail prematurely when called upon. This is especially important in today's business environment where such batteries are relied upon as power backups for large banks of computers. To prevent leakage of electrolyte around a battery terminal it is common to provide a plurality of annular rings extending around the head of the battery terminal, which is designed to be embedded in the wall of the container.

Battery terminals including annular rings on the head are typically formed from lead in a cold or hot forming process. In the hot forming process, a lead alloy is heated until it is in a molten state. The molten lead is then poured into a mold or casting and formed into a partially-finished or finished battery terminal. In the cold forming process a lead slug (typically at room temperature) is subjected to various pressing, punching and machining operations to create the finished battery terminal.

As mentioned above, the hot forming process requires that the lead be heated until it reaches the molten state and then subsequently poured into a multi-part mold until it cools. This is disadvantageous in that melting the lead alloy may create undesirable porosity in the finished battery terminal and is expensive to implement in an environmentally safe manner. In addition, the multi-part mold used in the hot forming process imposes design constraints on the battery terminal in that the various elements of the battery terminal must be shaped so that the battery terminal can be removed from the mold once the lead alloy has cooled. Thus, battery terminals formed by this process with annular rings must not include any undercuts or overhangs.

Existing methods of cold forming a battery terminal from a lead slug require a number of individual steps. In one known method a lead slug is first modified in a preform station and then subsequently formed into a finished battery terminal in a final forming press having a split die. Alternatively, in a second known method a lead slug is formed into a semi-finished battery terminal in a first station having a split die and then subsequently machined to create a finished battery terminal.

As with the multi-part molds of the hot forming process, the use of a split die to form a battery terminal with annular rings in the cold forming process limits the shape of the annular rings. In particular, the annular rings must not have any undercut or overhang because that would make it impossible to remove the battery terminal after forming is complete.

Most battery terminals formed today by the above-described processes have annular rings with substantially rectangular cross-sectional shapes because this simplifies manufacture thereof and thus reduces costs. It has been found, however, that annular rings having such simple profiles can result in leakage of electrolyte as the plastic material surrounding the battery terminal shrinks over time. By contrast, battery terminals having annular rings with undercuts or overhangs are less likely to leak as the plastic material shrinks over time because the more complex profile provides an improved labyrinth seal.

Consequently, it would be desirable to have a simplified process for cold forming a battery terminal with annular rings having undercuts or overhangs to improve sealing properties of the annular rings.

SUMMARY OF THE INVENTION

The present invention facilitates the manufacture of battery terminals that provide improved sealing properties for preventing leakage of electrolyte.

There is provided an apparatus for forming at least one ring with an undercut or overhang in the lead battery terminal. The apparatus includes a fixture configured to securely position the battery terminal. A segmented die station, including a plurality of segmented die members, is configured to transform at least one ring on the battery terminal from having a first shape without overhang into a second different shape with an undercut or overhang when the battery terminal is engaged by the plurality of segmented die members. The drive assembly is configured to move the plurality of segmented die members from an open position to a position in contact with the battery terminal.

There is also provided a method of forming at least one ring with an overhang on a lead battery terminal. The method includes the steps of securing the battery terminal within a fixture. Engaging the battery terminal with a plurality of segmented die members. At least one ring on the lead battery terminal is transformed from having a first shape without overhang into a second different shape with an undercut or overhang. Another embodiment of the method includes the steps of moving the plurality of segmented die members away from the battery terminal. Another embodiment includes the step of rotating one of the battery terminal and segmented die members relative to each other, and engaging the battery terminal with the plurality of segmented die members at least another time.

There is further provided an apparatus for forming at least one ring with an undercut or overhang on a lead battery terminal. The apparatus includes a fixture configured to securely position the battery terminal. A die station including a first die and a second die a spaced distance from the first die. Each die is configured in conjunction to transform at least one ring on a battery terminal from having a first shape into a second different shape with an undercut or overhang when the battery terminal is engaged by the second die and the first die wherein at least one die moves relative to the other die. A drive apparatus is configured to move one of the die relative to the other die. In another embodiment, the first die and second die are linear. In yet another embodiment, the second die is configured as a circular disk with a radius and the first die is configured in an arc with a radius proportional to the radius of the disk.

There is also provided a method of forming at least one ring with an undercut or overhang on a lead battery terminal. The method includes the steps of securing the battery terminal within a fixture. Engaging the battery terminal with a first and second die member. At least one ring on the battery terminal is transformed from having a first shape into a second different shape with an undercut or overhang, by moving one die relative to the second die.

There is also provided an apparatus for forming at least one ring with an undercut or overhang on a lead battery terminal. The apparatus includes a fixture configured to securely position the battery terminal. A die station including a first die and a second die a spaced distance from the first die. Each die is configured in conjunction to transform the battery terminal from having a first cyclindrical portion having a constant diameter into a second different shape with at least one ring having an undercut or overhang when the battery terminal is engaged by the second die and the first die as at least one die is configured to move relative to the other die. A drive apparatus is configured to move one of the die relative to the other die.

There is further provided a method of forming at least one ring with an undercut or overhang on a lead battery terminal. The method includes the steps of securing the battery terminal within a fixture. Engaging the battery terminal with the first and second die members. The lead battery terminal is transformed from having a first cyclindrical portion having a constant diameter into a second different shape with at least one ring having an undercut or overhang when the battery terminal is moved by one die relative to the second die.

These and other benefits and features of the invention will be apparent upon consideration of the following detailed description of preferred embodiments thereof, presented in connection with the following drawings in which like reference numerals identify like elements throughout.

BRIEF DESCRIPTION OF THE DRAWINGS

FIG. 2 is a cross-sectional view of the forming station in the open position.

FIG. 5 is a cross-sectional view of the rollers of the radial rolling spindle taken along line 5-5 in FIG. 4 prior to radial rolling.

FIG. 5A is a cross-sectional view of the partially formed battery terminal and a straight portion of one of the rollers taken along line 5A-5A in FIG. 5.

FIG. 6 is a cross-sectional view of the rollers of the radial rolling station taken along line 5-5 in FIG. 4 during a burnishing action.

FIG. 6A is a cross-sectional view of the partially formed battery terminal and a burnishing portion of the roller taken along line 6A-6A in FIG. 6.

FIG. 7 is a cross-sectional view of the rollers of the radial rolling station taken along line 5-5 in FIG. 4 during an initial shaping action.

FIG. 7A is a cross-sectional view through the partially formed battery terminal and an initial shaping portion of the roller taken along line 7A-7A in FIG. 7.

FIG. 13A is a schematic illustration of an exemplary embodiment of a die station for forming at least one ring with an undercut on a lead battery terminal, the die station including a first and second linear die with at least one die stationary and the battery terminal including a ring having a first shape.

FIG. 13B is a schematic illustration of the apparatus illustrated in FIG. 13A with one of the linear die having moved the battery terminal to transform the ring into a second different shape with the undercut.

DETAILED DESCRIPTION OF THE PREFERRED EMBODIMENTS

Figure 1:
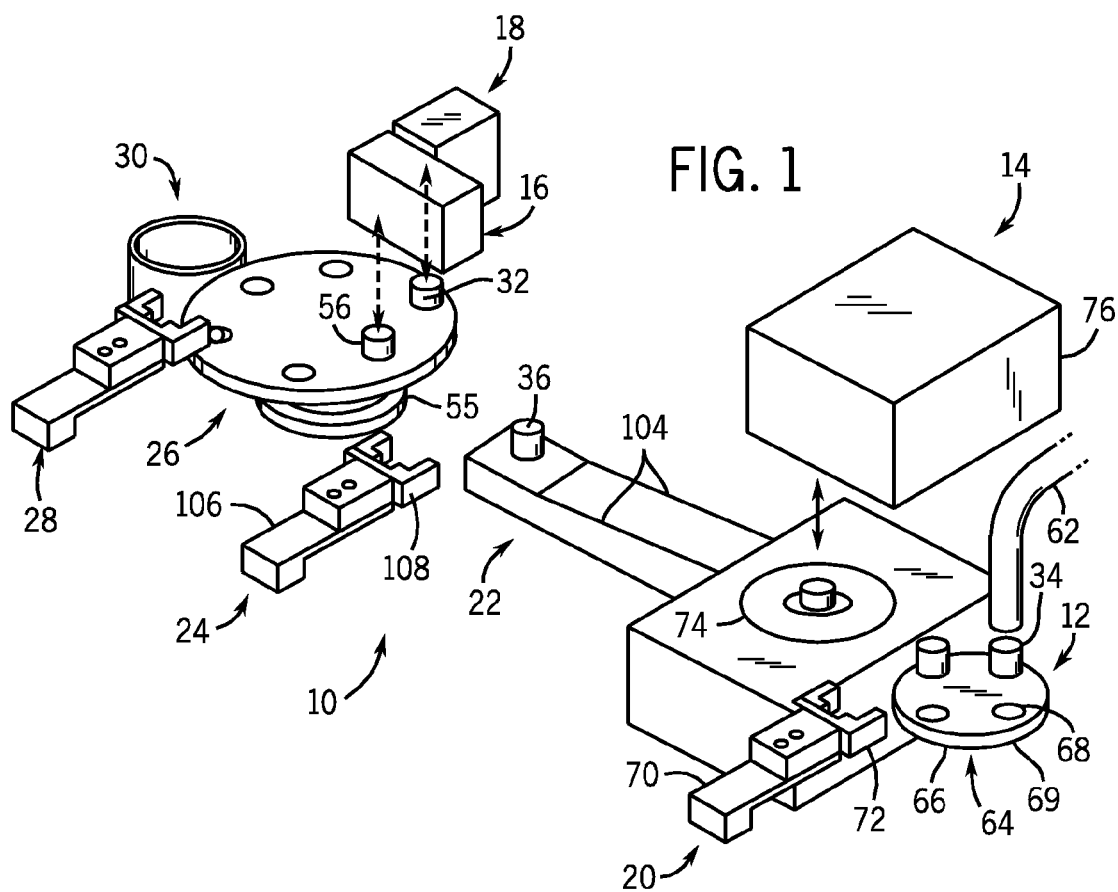
FIG. 1 is a schematic illustration of the lead slug pickup station, forming station, through punch station, radial rolling station, drop station and transfer mechanisms of the preferred embodiment.

Referring to FIG. 1, a battery terminal forming apparatus 10 includes four stations: a lead slug station 12, a forming station 14, a radial rolling station 16, and a through punch station 18. Additionally, apparatus 10 includes a first pick and place transfer mechanism 20, a vibratory transfer mechanism 22, a second pick and place transfer mechanism 24, an index (or fixture) assembly 26, a third pick and place transfer mechanism 28, and a drop station 30.

Figure 11A:
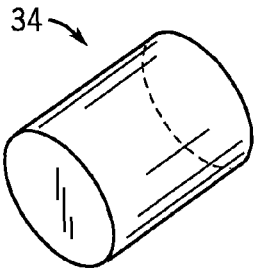
FIG. 11A is an isometric view of a lead slug.

Apparatus 10 creates a finished battery terminal 32 (see FIG. 11F) from a lead slug 34 (see FIG. 11A). Lead slug 34 is first transferred from lead slug station 12 to forming station 14 with first pick and place transfer mechanism 20. In forming station 14, lead slug 34 is cold pressed into a semi-finished battery terminal 36 (see FIG. 11B) including a frustum 38 having a frusto-conical shape, a splined ring 40 having a plurality of splined ring recesses 42 and tabs 44, a head 46 having a base (or root) diameter surface 48 and a pair of annular raised rings 50 extending outwardly therefrom, and a tapered recess 52 having a flat wall 54.

Figure 11F:
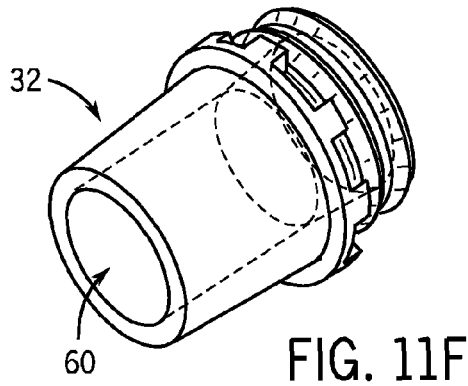
FIG. 11F is an isometric view of a finished battery terminal after punching out the bottom wall to form a through hole.
Figure 11B:
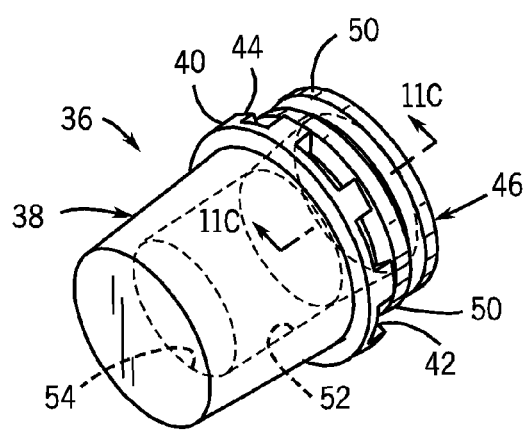
FIG. 11B is an isometric view of a semi-finished battery terminal after cold forming in a split die.
Figure 11C:
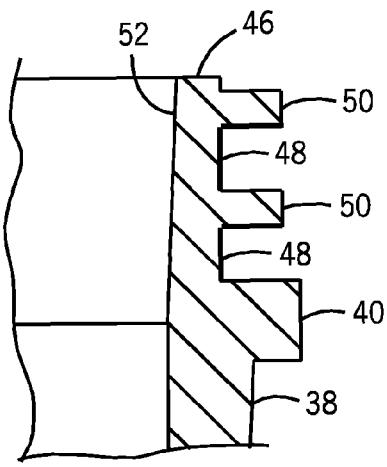
FIG. 11C is a cross-sectional view of the annular rings of the semi-finished battery terminal taken along line 11C-11C in FIG. 11B.
Figure 11D:
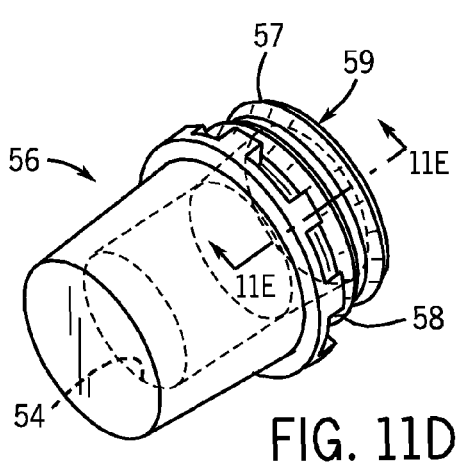
FIG. 11D is an isometric view of a near-finished battery terminal after radial rolling the annular rings into the desired arrowhead shape.
Figure 11E:
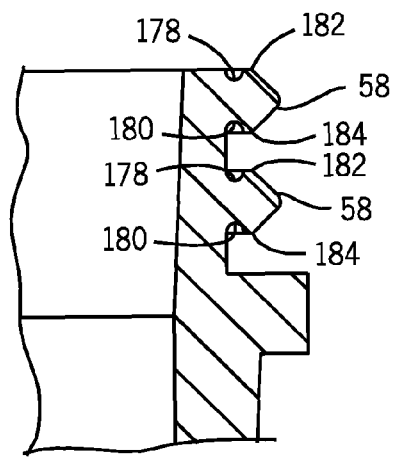
FIG. 11E is a cross-sectional view of the annular rings of the finished battery terminal taken along line 11E-11E in FIG. 11D.

Referring to FIG. 11E, the distance between element 178 on a first ring and element 180 on a second adjacent ring can be defined as the third longitudinal distance. Similarly, the distance between element 182 on a first ring and a facing element 184 on a second adjacent ring can be defined as the fourth longitudinal distance. The radial distance from the longitudinal axis of the terminal and elements 178, 180 can be defined as a first radial distance, and the radial distance from the longitudinal axis of the terminal and elements 182, 184 can be defined as a second radial distance, where the second radial distance is greater than the first radial distance. Referring to FIG. 11C, the longitudinal distance between the adjacent rings at the first radial distance can be defined as a first longitudinal distance and the longitudinal distance between the adjacent rings at the second radial distance can be defined as the second longitudinal distance.

Semi-finished battery terminal 36 is expelled from forming station 14 and positioned by vibratory transfer mechanism 22 for subsequent transfer by second pick and place transfer mechanism 24 to index assembly 26. Index assembly 26 is rotatably indexed by an index drive 55 such that semi-finished battery terminal 36 is positioned in radial rolling station 16.

In radial rolling station 16, semi-finished battery terminal 36 is cold roll formed into a near-finished battery terminal 56 (see FIG. 11D) having a head 57 with annular rings 58 that are arrowhead shaped in cross section. Finally, index assembly 26 positions near-finished battery terminal 56 in through punch station 18 for cold forming near-finished battery terminal 56 into finished battery terminal 32 (see FIG. 11F) having a through-hole tapered recess 60.

Referring now to FIGS. 1-10, battery terminal forming apparatus 10 and its manner of operation will be described in greater detail. Lead slug 34 is cut from a lead rod 62 and presented in lead slug station 12. Lead slug station 12 includes a transfer mechanism (e.g., a guide tube) to transfer lead slug 34 to an indexing turntable 64. Indexing turntable 64 includes a circular index plate 66 having a plurality of openings 68 which are closed at their lower ends by a bottom wall 69.

First pick and place transfer mechanism 20 includes an arm 70 and a gripper 72. Lead slug 34 is transferred from lead slug station 12 to forming station 14 by activation of arm 70 and gripper 72.

As shown in FIG. 2, forming station 14 includes a lower die assembly 74 and an upper die assembly 76. Lower die assembly 74 includes a cone shaped split die 78 seated in a conical opening 80. When forming station 14 is activated, the two halves of split die 78 come together to form an upwardly opening cylindrical die cavity 82. Each half of split die 78 includes a pair of grooves 84 which define a portion of die cavity 82. Grooves 84 are substantially rectangular in cross-sectional shape with each corner typically having a small radius of curvature. Lower die assembly 74 further includes a forming punch 86 in alignment with die cavity 82.

Upper die assembly 76 includes a press ram 88 having a die plate 90 mounted on the bottom of ram 88. A die 92 is mounted on die plate 90. Die 92 includes a downwardly opening die cavity 94 having a relatively wide cavity opening 96 and an upper frusto-conical beveled area 98. A knockout bar assembly 100 is supported by the press ram 88. Knockout bar assembly 100 includes a rod 102 in alignment with beveled area 98 of upper die 76 and forming punch 86 of lower die 74. Further details of the structure of forming station 14 are provided in commonly owned U.S. Pat. No. 5,606,887 (see, in particular, FIGS. 2-4 and the accompanying text), the entire contents of which are hereby incorporated by reference.

Lead slug 34 is placed within upwardly opening cylindrical die cavity 82 formed by split die 78. When forming station 14 is activated, press ram 88 forces the lower face of die plate 90 to bear against the upper surface of split die 78, which causes the two halves of split die 78 to be wedged down into conical opening 80. As a result of this compression, lead slug 34 flows between split die 78, forming punch 86, forming cavity 94 and the lower end of rod 102. In this manner, lead slug 34 is formed into semi-finished battery terminal 36 (see FIG. 11B) including frustum 38 having the frusto-conical shape, splined ring 40 having the plurality of splined ring recesses 42 and tabs 44, head 46 having the pair of annular rings 50, and tapered recess 52 having flat wall 54.

As upper die assembly 76 is raised from contact with lower die assembly 74, semi-finished battery terminal 36 remains seated in forming cavity 94 of upper die 76. Semi-finished battery terminal 36 is released from die 92 by actuating knockout bar assembly 100, and a timed blast of compressed air is used to expel semi-finished battery terminal 36 from forming station 14.

Referring again to FIG. 1, semi-finished battery terminal 36 is deposited in vibratory transfer mechanism 22, where it is oriented between sidewalls 104 such that head 46 is facing up. Sidewalls 104 are spaced apart a distance less than the diameter of splined ring 40 on semi-finished battery terminal 36. Sidewalls 104 are angled downward and are vibrated to translate semi-finished battery terminal 36 toward the end of sidewalls 104. Second pick and place transfer mechanism 24 includes an arm 106 and a gripper 108 for transferring semi-finished battery terminal 36 from vibratory transfer mechanism 22 to an index die 110 located in index assembly 26.

Figure 3:
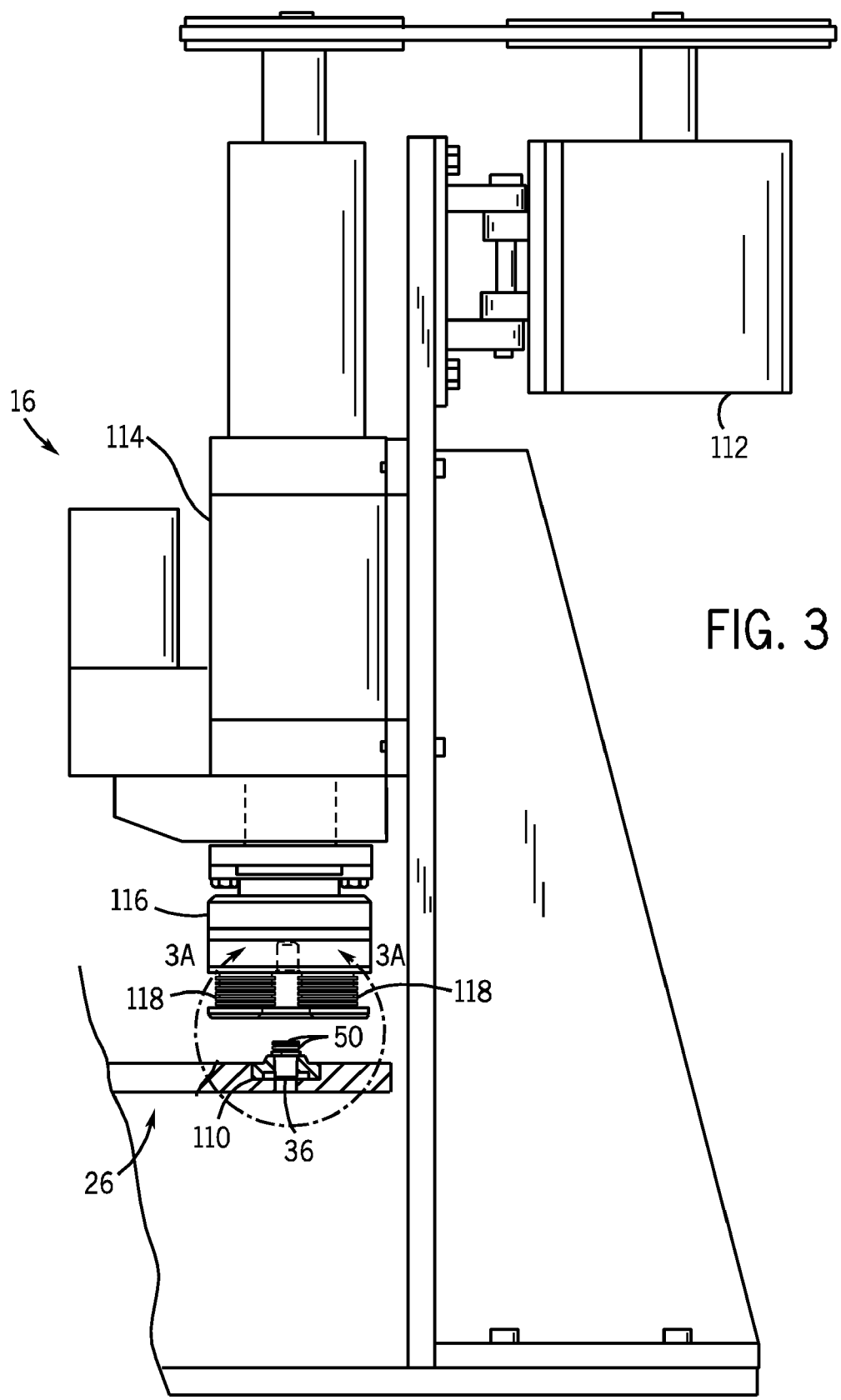
FIG. 3 is a side elevation view of the radial rolling station with the radial rolling spindle raised above the index assembly.
Figure 3A:
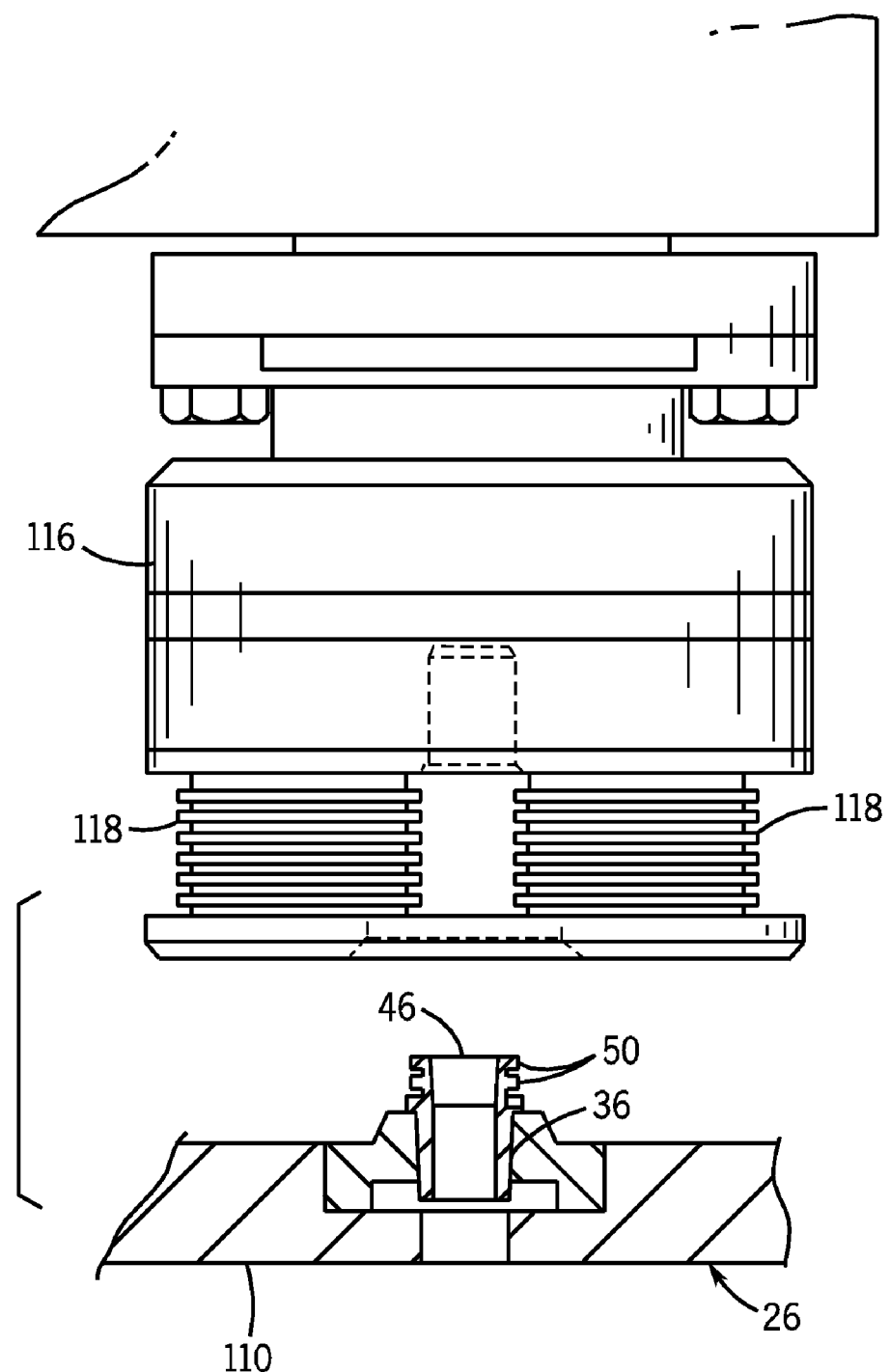
FIG. 3A is an enlarged partial cross-sectional view of the radial rolling spindle and index assembly taken along line 3A-3A in FIG. 3.

Turning now to FIGS. 3 and 3A, radial rolling station 16 includes a motor 112, a drive assembly 114, and a radial rolling spindle 116. Radial rolling spindle 116 includes three cam-shaped rollers 118 (see FIG. 5) having outer diameters configured for transforming semi-finished battery terminal 36 into near-finished battery terminal 56. Radial rolling spindle 116 is mounted above the edge of circular index assembly 26 in alignment with index die 110 and head 46 of semi-finished battery terminal 36.

Figure 4:
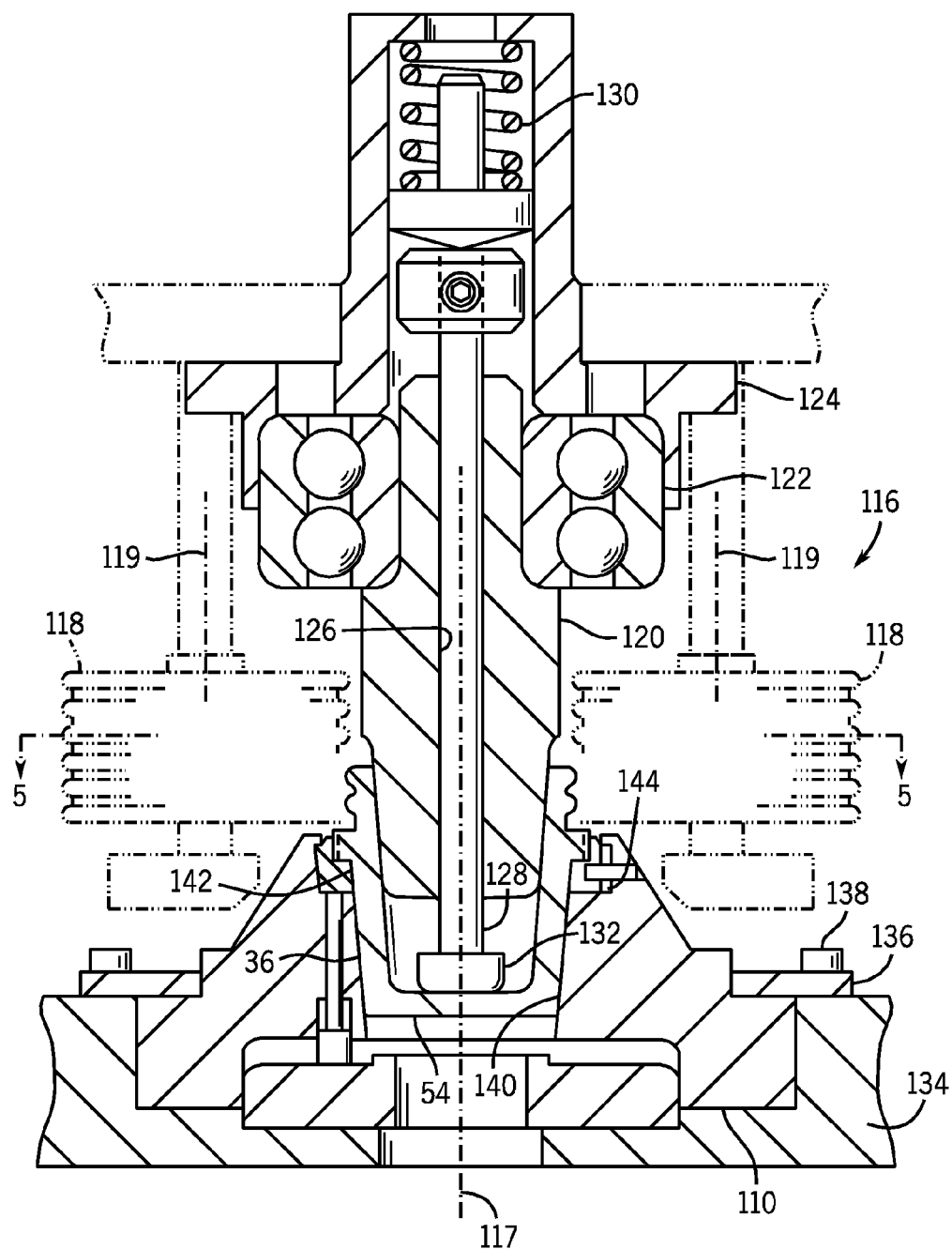
FIG. 4 is a cross-sectional view of the radial rolling spindle positioned to transform the annular rings on the partially finished battery terminal from their initial square cross-sectional shape into their desired arrowhead cross-sectional shape.

As shown in FIG. 4, radial rolling spindle 116 may include a plug member 120 supported for rotation by a ball bearing assembly 122. Ball bearing assembly 122 has an outer race which is secured in place by a clamping ring 124. Plug member 120 includes a bore 126 for receiving a rod 128 which is downwardly biased by a spring 130. The lower end of rod 128 includes a head 132 which engages flat wall 54 of semi-finished battery terminal 36 during the rolling process. Further details of the structure of radial rolling station 16 are provided in commonly owned U.S. Pat. No. 5,791,183 (see, in particular, FIGS. 17-23 and the accompanying text), the entire contents of which are hereby incorporated by reference.

Index die 110 used for holding battery terminal 36 during the rolling process is clamped to a base member 134 of circular index assembly 26 by an annular ring 136. Annular ring 136 is secured to base member 134 by a plurality of fasteners 138. Die 110 has an annular bore 140 with an enlarged diameter portion 142 at the top for receiving a split ring 144. Split ring 144 has an inner diameter that is substantially the same as the outer diameter of splined ring 40 to provide an interference fit that prevents battery terminal 36 from rotating during radial rolling. Preferably, the inner circumference of split ring 144 has a slight downwardly narrowing taper as well as a knurled inner surface to enhance the frictional interference fit when downward pressure is applied to battery terminal 36 during radial rolling. Additional or alternative means for preventing undesirable rotation of battery terminal 36 during radial rolling are provided in the aforementioned commonly owned U.S. Pat. No. 5,791,183 (see, in particular, FIGS. 17-23 and the accompanying text).

Referring now to FIGS. 5-9, the details of the radial rolling process used to transform annular rings 50 from their initial substantially rectangular cross-sectional shapes to their desired arrowhead cross-sectional shapes will be provided. To facilitate understanding of this process, a further explanation of the operation of radial rolling spindle 116 will first be provided.

During operation, radial rolling spindle 116 is continuously rotating in a clockwise direction about a central vertical axis 117 (see FIGS. 4 and 5) at a relatively high rate of speed. Thus, the three rollers 118 are revolving (or orbiting) about head 46 of battery terminal 36 at this high rate of speed. At the same time, each roller 118 is also rotating in a clockwise direction about its own vertical axis 119 at a relatively slow rate of speed. The entire radial rolling process requires a single 360° degree rotation of each roller 118 about its associated axis 119 to transform the annular rings 50 from their initial substantially rectangular cross-sectional shape into their desired substantially arrowhead cross-sectional shape. During this single rotation of each roller 118 about its individual axis 119, however, the roller 118 will have made multiple revolutions (or orbits) about central axis 117 and head 46.

For example, if each roller 118 is rotating about its individual axis 119 at 60 RPM, while the three rollers 118 are simultaneously revolving (or orbiting) about central axis 117 (and thus head 46) at 500 RPM, each roller 118 will complete about 8.3 orbits (=500/60) about head 46 during the single rotation of roller 118 needed to transform the annular ring to the desired shape. On the other hand, if each roller is rotating about its individual axis 119 at 30 RPM, while the three rollers 118 are simultaneously revolving (or orbiting) about central axis 117 (and thus head 46) at 600 RPM, each roller 118 will complete about 20 orbits (=600/30) about head 46 during the single rotation of roller 118 needed to transform the annular ring to the desired shape. Of course, persons skilled in the art will recognize that the use of different rotational speeds for radial rolling spindle 116 and individual rollers 118 will provide a different number of orbits for the manufacture of each battery terminal.

As shown in FIGS. 5-9, the outer circumference of each roller 118 includes a straight portion 146, a burnishing portion 148, an initial shaping portion 150, and a final shaping portion 154. The various portions of the outer circumference of each roller 118 may be in the form of a step function—that is, an abrupt transition may be utilized between each of the three portions. Alternatively, a smooth and gradual transition may be utilized between each of the three portions of the outer circumference.

Referring now to FIGS. 5 and 5A, it can be seen that straight portions 146 of rollers 118 permit radial rolling spindle 116 to be lowered into working position with the three rollers 118 surrounding head 46 of semi-finished battery terminal 36.

As each roller 118 continues its clockwise rotation about its associated axis 119, burnishing portion 148 removes any flash (or parting) lines on base diameter surface 48 of head 46 and also smoothes and polishes base diameter surface 48. As shown in FIGS. 6 and 6A, this burnishing action is provided by a plurality of rectangular (or similarly) shaped raised ridges 152 on each roller 118 configured to rub against base diameter surface 48 of head 46 between and below annular rings 50. If desired, burnishing portion 148 may also be configured to rub against and burnish other portions of battery terminal 36 such as rings 50 or splined ring 40. Preferably, burnishing portion 148 comprises about the first one third of the curved outer circumference of each roller 118.

Figure 9:
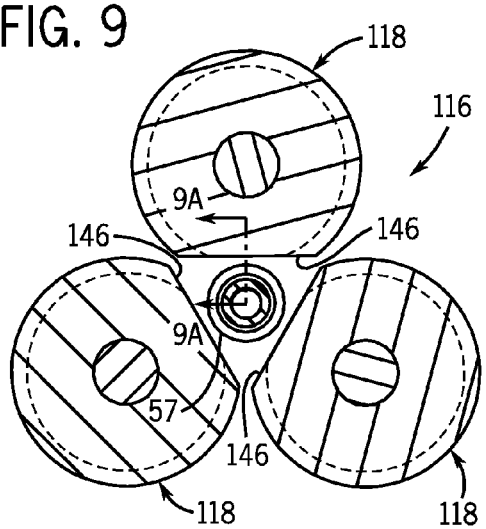
FIG. 9 is a cross-sectional view of the rollers of the radial rolling station taken along line 5-5 in FIG. 4 after completion of radial rolling.
Figure 9A:
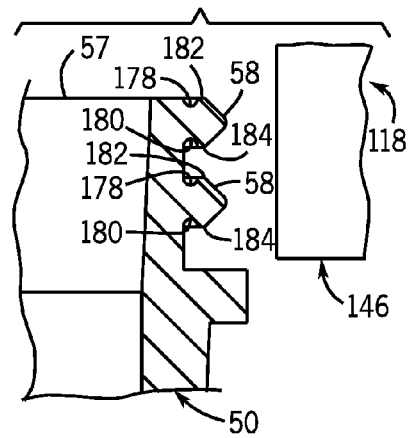
FIG. 9A is a cross-sectional view through the partially formed battery terminal and the straight portion of the roller taken along line 9A-9A in FIG. 9.

Turning now to FIGS. 7 and 7A, initial shaping portions 150 of rollers 118 begin to transform the two annular rings 50 from their initial rectangular cross-sectional shape (resulting from rectangular grooves 84 in split die 78) into their desired arrowhead cross-sectional shape (FIG. 9A). This initial shaping action is provided by a pair of triangular or V-shaped valleys 156, each of which is defined by a pair of angled sidewalls 158 configured to rub against upper and lower corners 160 and 161 of the associated annular ring 50. The sidewalls 158 of each valley 156 may be set at an angle relative to each other of between about 90° to about 120°, and preferably about 110°. Angled sidewalls 158 preferably extend sufficiently above and below the respective upper and lower sidewalls of annular rings 50 to provide upper and lower gaps 162 and 164, respectively, into which the material pushed from upper and lower corners 160 and 161 of annular rings 50 can flow. Preferably, the initial shaping portion 150 comprises about the second one third of the curved outer circumference of each roller 118.

Figure 8:
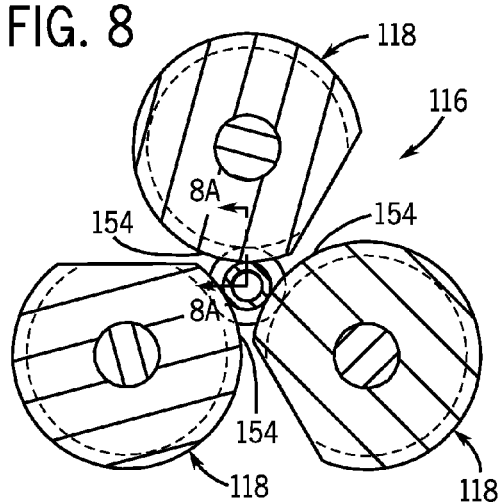
FIG. 8 is a cross-sectional view of the rollers of the radial rolling station taken along line 5-5 in FIG. 4 during a final shaping action.
Figure 8A:
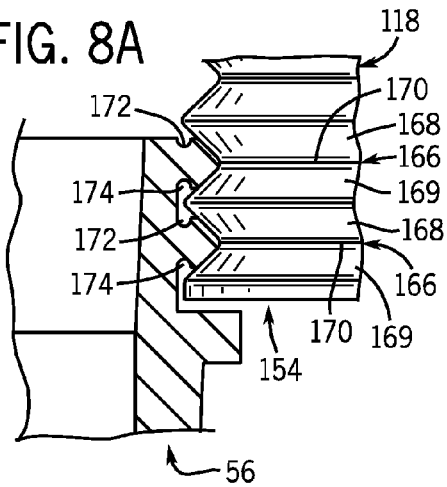
FIG. 8A is a cross-sectional view through the partially formed battery terminal and the final shaping portion of the roller taken along line 8A-8A in FIG. 8.

Referring now to FIGS. 8 and 8A, final shaping portions 154 of rollers 118 complete the transformation of annular rings 50 from their blunted arrowhead cross-sectional shape into the pointed arrowhead cross-sectional shape (FIG. 9A) of annular rings 58 on near-finished battery terminal 56. This final shaping action is provided by a pair of triangular or V-shaped valleys 166, each of which is defined by a pair of angled sidewalls 168 and 169 which intersect at a point 170. Valleys 166 on final shaping portions 154 have substantially the same configuration as valleys 156 on initial shaping portions 150, but the diameter of each roller 118 is increased for the final shaping portion to continue the shaping process.

Once again, the angled sidewalls 168 and 169 of each valley 166 preferably extend sufficiently above and below the associated upper and lower sidewalls of annular rings 58 to provide upper and lower gaps 172 and 174, respectively, into which the material pushed from upper and lower corners of annular rings 58 can flow.

Figure 8B:
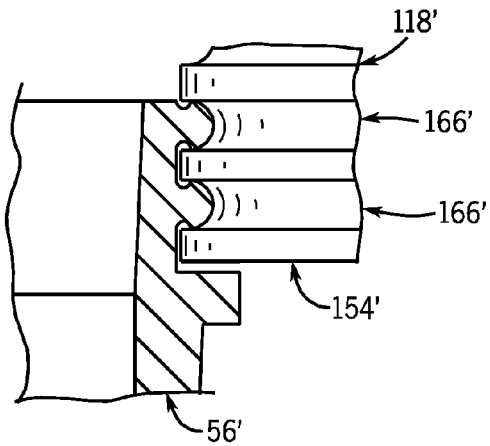
FIG. 8B is a cross-sectional view similar to FIG. 8A but showing an alternative embodiment of the roller and battery terminal.

Although the initial and final shaping portions 150 and 154 of rollers 118 are configured to transform annular rings 50 from their initial rectangular cross-sectional shape to a pointed arrowhead cross-sectional shape, persons skilled in the art will recognize that other shapes could easily be obtained with the present invention. For example, FIG. 8B shows an alternative roller 118' with a final shaping portion 154' including a plurality of semi-circular valleys 166'. Semi-circular valleys 166' are configured to rub against the upper and lower corners of annular rings 58' of a near-finished battery terminal 56' to cause the material thereof to flow into a mushroom head when viewed in cross-section.

FIGS. 9 and 9A show the angular positions of rollers 118 after each roller has completed one full rotation (i.e., 360°) about its associated axis 119. At this point, straight portion 146 of each roller 118 is facing towards head 57 of near-finished battery terminal 56 and thus radial rolling spindle 116 may be raised clear of battery terminal 56. As radial rolling spindle 116 is raised, spring biased rod 128 (see FIG. 4) ensures that near-finished battery terminal 56 remains seated in index die 110. Near-finished battery terminal 56 includes annular rings 58 which exhibit the desired arrowhead cross-sectional shape. Each annular ring 58 thus includes upper and lower undercuts 178 and 180 which provide corresponding upper and lower overhangs 182 and 184. Each undercut 178 and 180 preferably has a relatively small radius of curvature, such as between about 0.10 to 0.30 inches, and even more preferably about 0.015 inches.

Figure 10:
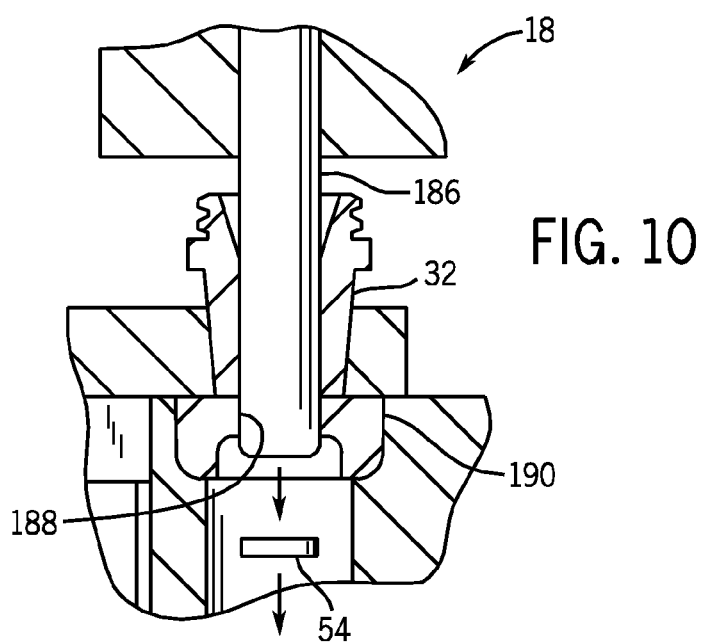
FIG. 10 is a cross-sectional view of the punching station.

Referring back to FIG. 1, upon completion of radial rolling the index assembly 26 positions near-finished battery terminal 56 in through punch station 18. As shown in FIG. 10, through punch station 18 includes a through punch 186 aligned with an opening 188 of anvil 190. When punch station 18 is activated, punch 186 removes flat bottom wall 56 from near-finished battery terminal 56 (FIG. 11D) to produce finished battery terminal 32 (FIG. 11F).

Figure 12A:
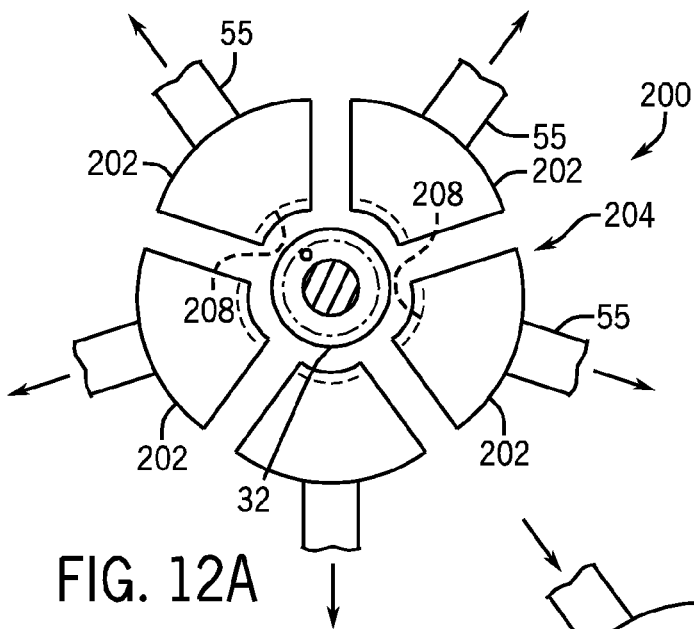
FIG. 12A is a top schematic illustration of an exemplary embodiment of a segmented die in an open position with an exemplary embodiment of a battery terminal having a first shape positioned to be transformed to a second shape.
Figure 14:
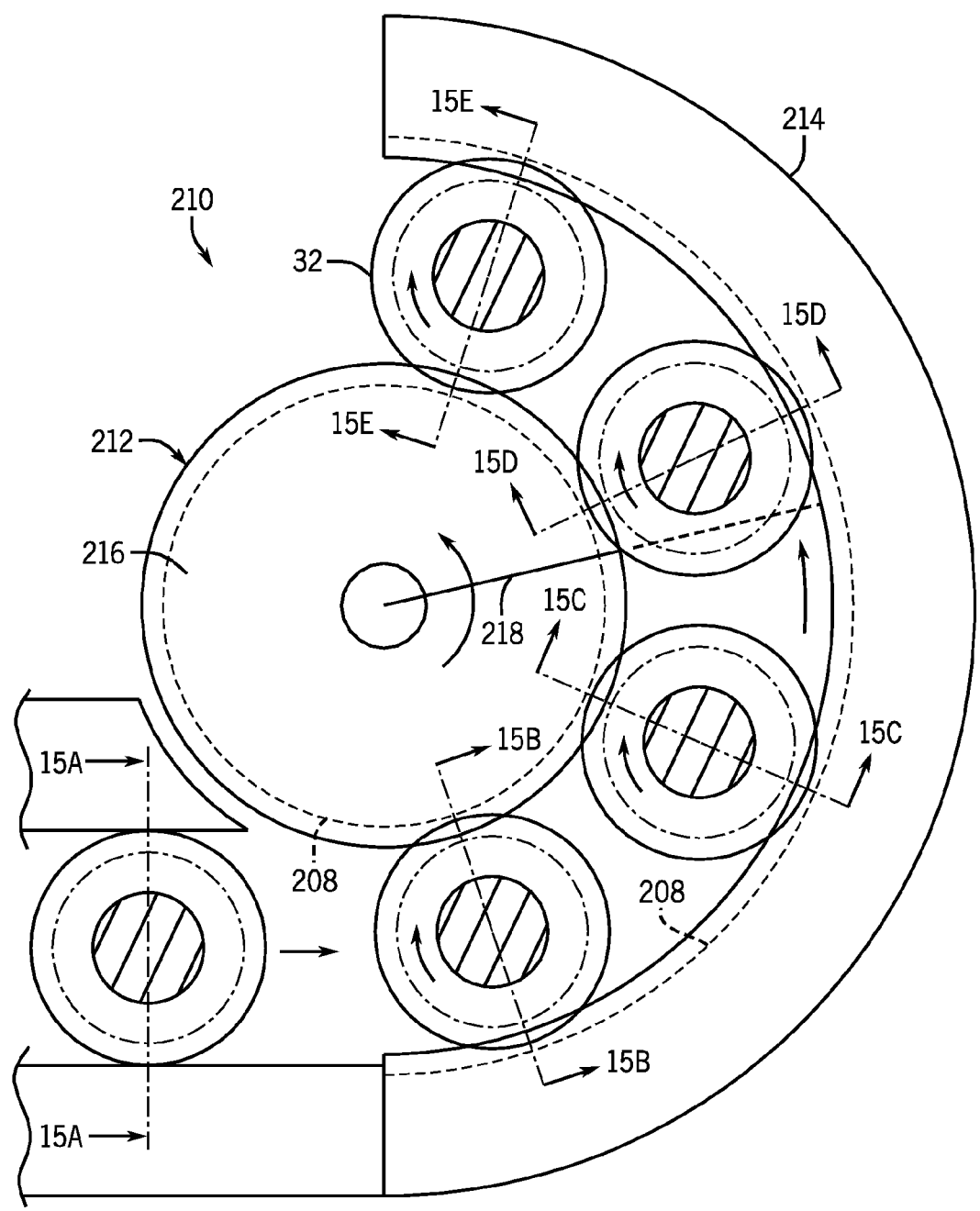
FIG. 14 is a schematic illustration of an exemplary embodiment of a die station for forming at least one ring with an undercut on a lead battery terminal, the apparatus including a second die configured as a circular disc with a radius and first die configured in an arc with a radius proportional to the radius of the disc and positioned a spaced distance from the second die.

Referring now to FIGS. 12A-15E, several exemplary embodiments of apparatus and methods forming at least one ring with an undercut or an overhang on a lead battery will be discussed. FIGS. 12A, 12B and 12C schematically illustrate a segment die apparatus. FIGS. 13A and 13B schematically illustrate a flat or linear die apparatus. FIG. 14 schematically illustrates a planetary die apparatus.

An apparatus 10 for forming at least one ring 50 with an undercut 180 or an overhang 184 of a lead battery terminal 32 includes a fixture configured to secure or position the battery terminal 32 as more fully described above. A segmented die station 200 is positioned to receive the lead slug from the lead slug station 12 described above. Segmented die station 200 includes a plurality of segmented die members 202 which are configured to transform at least one ring 50 on a battery terminal 32 from having a first shape into a second different shape with an undercut 180 or overhang 184. It should be understood that the segmented die station 200 may include multiple stations, with a first station to create rings and a second station to create the undercut or overhang. The battery terminal 32 is engaged by the plurality of segmented die members 202.

In operation, the segmented die punch station 200 reciprocally moves the segmented die members 202 toward and away from the lead battery terminal slug a sufficient number of times needed to create the undercut or overhang on rings of the battery terminal 32. A drive assembly 55 is configured to move the plurality of segmented die members 202 from an open position 204 to a position in contact 206 with the battery terminal and to rotate one of the battery terminal 32 and the segmented die members relative to each other a fixed number of degrees after each cycle of engagement and disengagement by the plurality of segmented die members. (See FIGS. 12A, 12B and 12C.)

In the illustrated embodiment, there are five die members 202 and the battery terminal 32 rotates seventy-two degrees (72°) between tooling hits. The amount of degrees of rotation can be determined manually or by an automated process. This motion is repeated until at least one ring 50 is uniform and has a consistent undercut 180 or overhang 184.

Figure 12B:
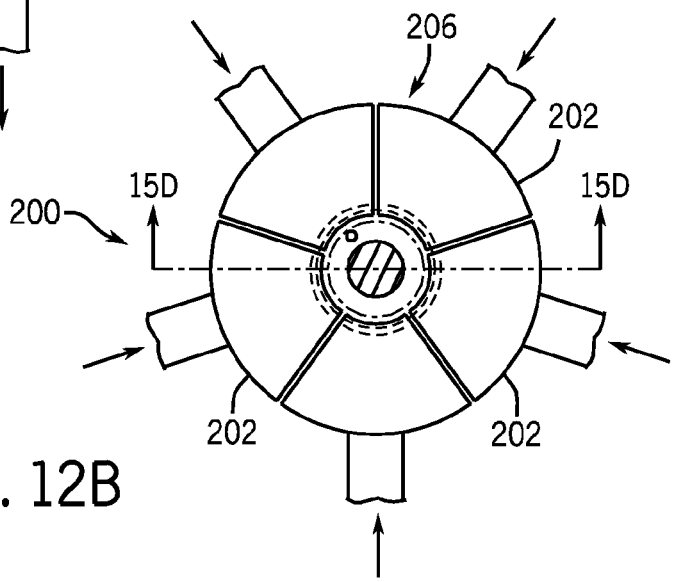
FIG. 12B is a top schematic illustration of the segmented die in a closed position about the battery terminal.
Figure 12C:
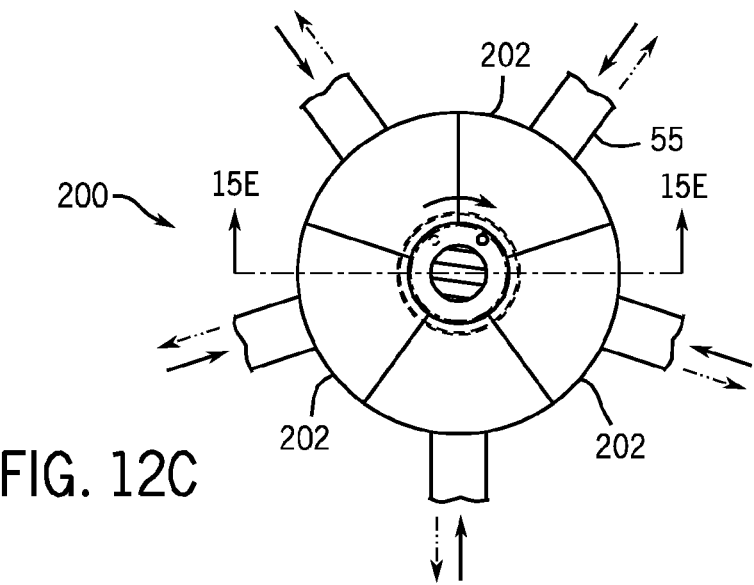
FIG. 12C is a top schematic illustration of the segmented die engaging in the battery terminal and illustrating the rotation of the battery terminal and reciprocal action of the segmented die in transforming at least one ring on the battery terminal into the second different shape.
Figure 15A:
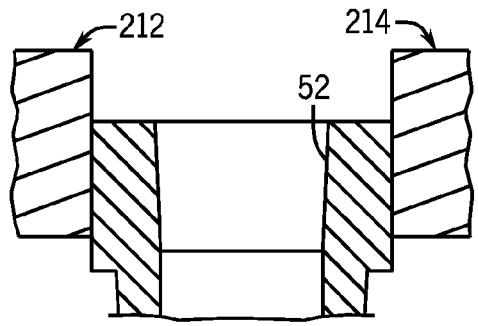
FIGS. 15A-15E are partial sectional views of an exemplary embodiment of a battery terminal progressing through a die station for forming at least one ring with an undercut or overhang on the battery terminal, with FIG. 15A illustrating a first shape and sequentially to FIG. 15E illustrating a second shape.
Figure 15B:
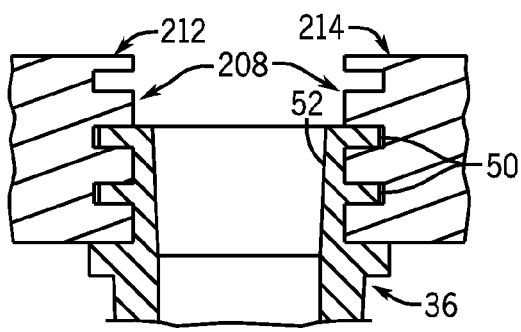
Figure 15C:
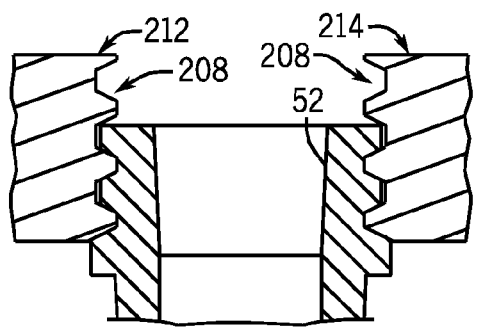
Figure 15D:
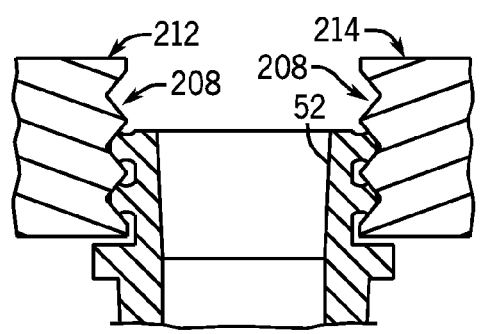
Figure 15E:
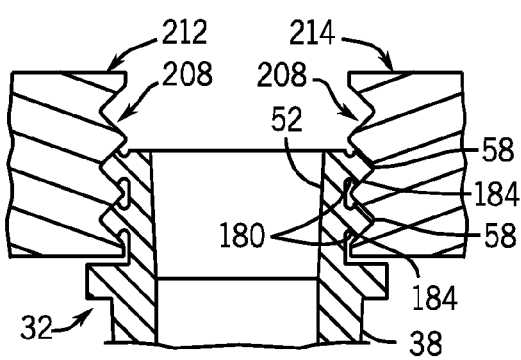

In FIG. 12B, the sectional line 15D illustrates when the segmented die station 200 engages the battery terminal 32 to form a near-finished battery terminal. FIG. 12C illustrates that the battery terminal 32 is rotated 72 degrees and is again engaged by the segmented die members 202. FIG. 15E illustrates a finished battery terminal 32 having generally arrow head shaped rings. It should be understood that the segmented die members 202 can be of any suitable number more or less than five and that the rotation of the battery terminal between tooling hits by the segmented die members 202 is adjusted accordingly. A die cutting face 208 of each of the segmented die members 202 is configured to progressively form the shape of at least one ring 50 with the undercut 180 or overhang 184 as illustrated in FIGS. 15A through 15E as the battery terminal 32 is progressively modified from the first shape to the second shape.

Referring to the specific embodiment illustrated in FIGS. 15A-15E, the shape of the at least one ring 50 is shown progressively modified from a first shape to a second shape. The first shape of ring 50 includes a substantially symmetrical cross-section and a first inner width of the inner portion at least as wide as a first outer width of the outer portion. The second shape includes a substantially symmetrical cross-section and a second outer width of the outer portion greater than a second inner width of the inner portion. The second inner width of the inner portion is defined by the distance between upper undercut 178 and lower undercut 180. The second outer width of the outer portion is defined by the distance between upper overhang and lower overhang 184. The transition between the second inner width of the inner portion and the second outer width of the outer portion defines a shoulder. Splined ring 40, located between frustum 38 and the at least one ring 50, has substantially the same shape when ring 50 is the first shape and the second shape.

Another embodiment and apparatus transforming at least one ring with an undercut or an overhang on a lead battery terminal is illustrated in FIGS. 13A and 13B. Specifically, the die station 210 includes a first die 212 and a second die 214. The second die 214 is positioned a spaced distance from the first die 212 with each die configured in conjunction to form at least one ring 50 on the battery terminal 32 from having a first shape into a second different shape with an undercut 180 or an overhang 184. The battery terminal 32 is engaged by the second die 214 and the first die 212 with at least one die moving relative to the other die. Movement of the die is performed by a drive apparatus 215 configured to move one of the die relative to the other die.

The specific embodiment illustrated in FIGS. 13A and 13B are linear or flat dies with one die fixed or stationary. It should be understood, however, that either the first die or the second die can be configured to be stationary and it is also contemplated that both dies can be moveable relative to each other during the procedure in transforming the battery terminal 32 from a first shape to a second different shape with the undercut or overhang. The die cutting face 208 on each of the first and second dies 212, 214 is configured to progressively transform the battery terminal 32 from a first shape to a second shape with an undercut or overhang as illustrated in FIGS. 15A through 15E. It should be understood that a first shape can include at least one ring without an overhang (see FIG. 15B) or the initial shape can be a first cylindrical portion having a constant diameter as illustrated in FIG. 15A.

Another embodiment of the die station 210 is illustrated in FIG. 14. The specific embodiment illustrated in FIG. 14 includes circular dies. One die is configured as a circular disk 216 having a radius 218. The other die is configured in an arc with a radius proportional to the radius 218 of the disk 216. The battery terminal 32 moves between the two dies. The die cutting face 208 on each of the first and second dies 212, 214, is configured to progressively transform the battery terminal 32 from a first shape to a second shape with an undercut or an overhang as illustrated in FIGS. 15A through 15E. In one embodiment, the circular disk 216 rotates and propels the battery terminal 32 between the two dies.

It is contemplated that a suitable mandrel may be inserted into the battery terminal to retain the shape of the inside diameter during the forming process in either the linear die apparatus or the planetary die apparatus described above.

It is important to note that the above-described preferred embodiments of the apparatus and method for cold forming a ring on a lead battery terminal are illustrative only. Although only certain embodiments have been described above in detail, those skilled in the art will appreciate that many modifications are possible without materially departing from the novel teachings and advantages of the subject matter described herein. For example, although radial rolling spindle 116 made use of three rollers 118 were for radial rolling, a lesser or greater number of rollers (e.g., one, two or four) could have been used in performing the claimed process. In addition, although the annular rings were initially formed on the battery terminal by means of split die 78, the annular rings could have been formed by means of a unitary die or any other known hot or cold forming process. For example, a first radial rolling operation could have been used to raise the annular rings with rectangular cross-sections on the battery terminal as disclosed in the above-identified U.S. Pat. No. 5,791,183 (incorporated by reference above), and a second radial rolling operation as described above could then have be used to transform the annular rings into their desired arrowhead cross-sectional shape. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. An apparatus for forming rings on a battery terminal, the apparatus comprising:
a die station including a plurality of cold forming members moving relative to one another to transform at least a first ring and a second outwardly extending ring on a cylindrical battery terminal body from a first shape to a second shape,
the first ring and the second ring each including in both the first shape and in the second shape a first portion a first radial distance from a longitudinal axis of the battery terminal and a second portion a second radial distance from the longitudinal axis, the second radial distance being greater than the first radial distance;
wherein in the first shape the first portion of the first ring is spaced a first longitudinal distance from the first portion of the second ring, and the second portion of the first ring is spaced a second longitudinal distance from the second portion of the second ring;
wherein in the second shape the first portion of the first ring is spaced a third longitudinal distance from the first portion of the second ring, and the second portion of the first ring is spaced a fourth longitudinal distance from the second portion of the second ring, the second longitudinal distance being greater than the fourth longitudinal distance, and the third longitudinal distance being greater than the fourth longitudinal distance; and
a drive apparatus configured to move the at least one cold forming member relative to another cold forming member.

2. The apparatus of claim 1, wherein the second ring is disposed adjacent to the first ring.

3. The apparatus of claim 1, wherein the second longitudinal distance is greater than or equal to the first longitudinal distance.

4. The apparatus of claim 1, wherein the plurality of cold forming members includes cam-shaped rollers.

5. The apparatus of claim 1, wherein the plurality of cold forming members includes segmented die members.

6. The apparatus of claim 5, wherein one of the battery terminal and the segmented die members is rotated relative to the other.

7. The apparatus of claim 6, wherein the rotation is about the longitudinal axis of the battery terminal.

8. The apparatus of claim 1, wherein the plurality of cold forming members includes a first linear die and a second linear die.

9. The apparatus of claim 1, wherein the plurality of cold forming members includes a first cold forming member configured as an arc and a second cold forming member configured as a disk.

10. The apparatus of claim 1, wherein the at least a first ring and a second ring is two or more rings.

11. A method for forming at least one ring on a battery terminal from a first shape to a second shape, the method comprising:
providing a battery terminal having a longitudinally extending body with at least one ring having a first shape extending 360 degrees about the longitudinal axis of the body and extending radially outward therefrom, the body extending along the longitudinal axis a distance greater than the ring;
providing a plurality of cold forming members and a drive apparatus;
engaging the battery terminal with the plurality of cold forming members, the plurality of cold forming members operating in a plane substantially perpendicular to the longitudinal axis of the battery terminal to transform the ring from a first shape having a first portion a first radial distance from the longitudinal axis of the battery terminal and a second portion a second radial distance from the longitudinal axis of the battery terminal, the second radial distance being greater than the first radial distance, wherein the first portion has a first width being at least as wide as a first width of the second portion, into a second different shape wherein the second portion includes a second width greater than a second width of the first portion, when one or more of the plurality of cold forming members is moved relative to another cold forming member; and disengaging the battery terminal.

12. The method of claim 11, wherein transforming the ring from the first shape to the second different shape further includes moving a first portion of the ring a first direction and a second portion of the ring a second direction, the first direction and the second direction being generally perpendicular to the longitudinal axis of the battery terminal, and the first direction being generally opposite the second direction.

13. The method of claim 11, wherein the plurality of cold forming members includes an odd number of cold forming members.

14. The method of claim 11, wherein the plurality of cold forming members includes cam-shaped rollers.

15. The method of claim 11, wherein the plurality of cold forming members includes segmented die members.

16. The method of claim 15, wherein one of the battery terminal and the segmented die members is rotated relative to the other.

17. The method of claim 11, wherein the plurality of cold forming members includes a first linear die and a second linear die.

18. The method of claim 11, wherein the plurality of cold forming members includes a first die configured as an arc and a second die configured as a disk.

19. The method of claim 11, wherein the at least one ring is two or more rings.

20. The apparatus of claim 11 wherein the plurality of cold forming members moving relative to one another to transform at least a first ring and a second ring on a battery terminal, transform the rings 360 degrees about an outer periphery of the body.

* * * * *